Nov. 8, 1966  M. P. FRICKE  3,283,561
CONTROL APPARATUS
Filed Dec. 23, 1963
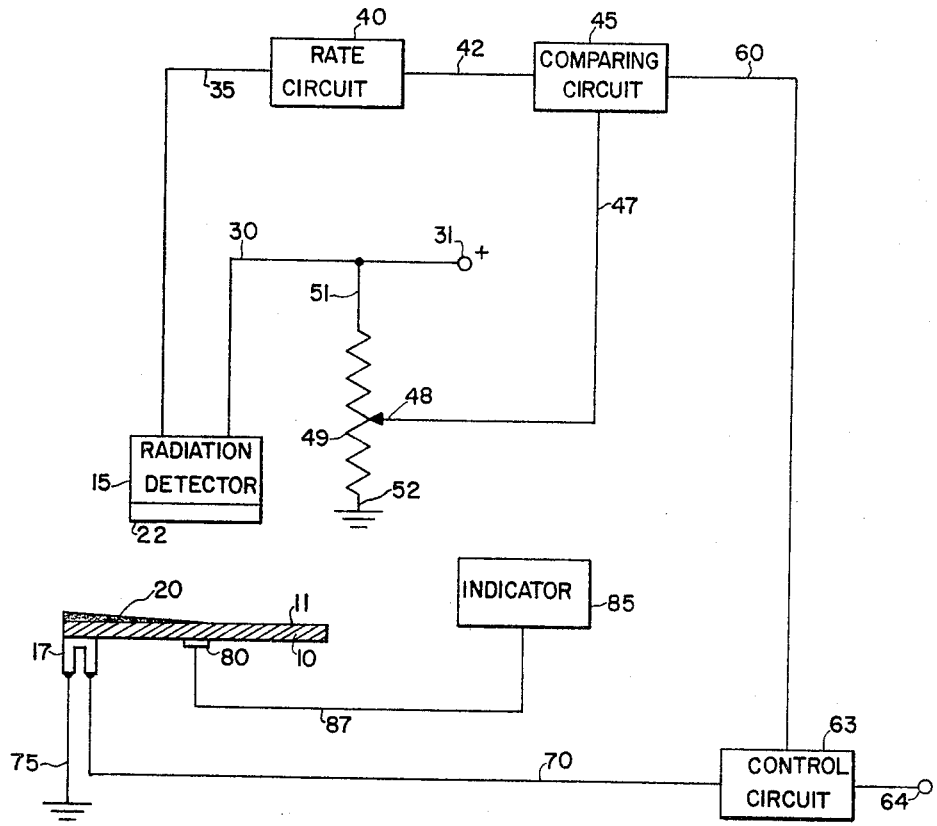
INVENTOR.
MARTIN P. FRICKE
BY Charles J. Ungemach
ATTORNEY

United States Patent Office 3,283,561
Patented Nov. 8, 1966

3,283,561
CONTROL APPARATUS
Martin P. Fricke, Fridley, Minn., assignor to Honeywell Inc., a corporation of Delaware
Filed Dec. 23, 1963, Ser. No. 332,770
8 Claims. (Cl. 73—17)

This invention relates to a humidity sensing device and more specifically to an improved dew point or frost point sensor utilizing nuclear radiation as a means for detecting existence of dew or frost on a surface in combination with temperature measuring means attached to the surface for detecting the temperature corresponding to the dew or frost point.

It has long been known that the humidity of an air sample is directly related to the temperature at which the air will condense to form dew, or freeze to form frost. A number of prior art systems have been devised for determining the dew or frost point temperature, but each has had certain drawbacks which the present invention is intended to overcome. Systems employing a cooled surface exposed to the ambient air so that dew or frost collects on the surface, have been known in the prior art. In one form of such a device the detection of dew or frost was accomplished by reflecting visible light from the surface to a photocell. When dew or frost began to form, the light reflection became defused and the output of the photocell would change. The temperature of the surface at this point would then be substantially that of the dew or frost point temperature. One major drawback from such a system is that the container housing the detection apparatus would necessarily have to be shielded from extraneous light. In so shielding, it was frequently difficult to provide free access for the ambient air into the space surrounding the surface with the result that somewhat trapped air existed near the surface, the humidity of which was not necessarily the same as the ambient air.

In a copending application of John G. Ballinger, Serial No. 158,356, filed December 11, 1961, and assigned to the assignee of the present invention, a novel detection system was described in which the surface was made radioactive so as to emit alpha particles for example. The formation of dew or frost would impede or change the energy of the alpha particles leaving the surface, and this change would be detected by radiation detecting means in such a manner as to control the cooling of the surface and maintain a predetermined dew or frost thickness thereon. The temperature of the surface was then related to, and indicative of, the humidity of the ambient air. While this system is quite accurate and sufficient, it does tend to be somewhat costly, since it is frequently desirable to use a comparison radiation detector and several electronic components, including a timer. The reason the additional apparatus was desirable stems from the fact that the dew or frost formation operates to change the energy of the particles being emitted from the surface, but not necessarily the number of particles. Change of energy is more difficult to detect than change in number of particles being emitted, and consequently, some rather elaborate electronics were found desirable.

The present invention has as a purpose to provide a humidity sensing device whose accuracy is substantially equivalent to that of the above mentioned copending application, but which utilizes fewer and less expensive components. Briefly, the invention differs from the above copending application in that the surface upon which dew or frost collects is not uniformly cooled so that dew or frost does not form over the entire surface. A temperature gradient is set up on this surface so that upon one portion thereof, dew or frost may collect, but on another portion, there is no impediment to the radiation emitted. A radiation detector is positioned to receive the radiation from the surface and a filter may be employed between the surface and the detector. While, as mentioned above, the collection of dew or frost does not necessarily change the number of particles emitted, it does decrease the energy thereof and the filter employed in the present invention is chosen so as to substantially block particles having less than a predetermined energy. Thus, the energy received by the detector is substantially completely that emitted from the portion of the surface upon which no dew or frost has collected. Because of this, it is not necessary to attempt to detect changes of energy, but is only necessary to count the particles received at the detector. The radiation detector produces an output which is of the number of particles of radiation received and this signal is used to control the cooling means for the surface. In controlling the temperature of the surface, a line between the collection of dew or frost and the clear surface may be controlled at a predetermined position on the surface. The temperature along this line is substantially the temperature at which frost or dew is just beginning to form, and is thus closely related to the frost or dew point temperature. A temperature measuring device is located so as to detect the temperature at this point to provide a detection of the humidity of the ambient air.

A more complete understanding of the operation will be obtained upon examination of the following specification and claim and drawing, in which the figure is a schematic representation of a preferred embodiment of the present invention.

Referring to the drawing, element 10 is shown having an upper surface 11 exposed to the ambient air, the humidity of which is to be detected. The element 10 is made radioactive so as to emit radiant energy from the surface 11 in the form of alpha or beta particles, for example. The radiation will leave the upper surface 11 and travel toward a radiation detector 15, which may be a Geiger-Mueller tube, for example. Attached to one portion of the element 10 is a cooling device 17, which may, for example, be a Peltier cooler, the temperature of which varies with the electrical current traveling therethrough. While shown in the drawing, the cooling device 17 is connected to one end of the element 10, this showing is merely for convenience, and in practice the cooler may be attached at any predetermined location. The purpose of the cooler is to lower the temperature of one portion of element 10 to below the dew or frost point temperature, and to establish a temperature gradient along the element 10 so that at a remote position on element 10, the temperature is above the frost or dew point temperature. For simplicity, the frost or dew will be referred to as condensate, and the frost or dew point temperature will be referred to as the condensate temperature. Since one portion of the element 10 is below the condensate temperature, and one portion is above condensate temperature, condensate will form on the surface 11 of element 10, as shown by reference numeral 20 in the figure. Somewhere along the surface 11 an edge will be defined wherein condensate no longer forms. The temperature along this line will be substantially the condensate temperature, and will thus be related to the humidity of the ambient air.

The radiant energy, leaving the surface 11 in the form of alpha particles, for example, will be impeded by the formation of condensate to reduce the energy thereof on the left side of surface 11, shown in the figure, while the radiation on the right side of surface 11, beyond the condensate line, will have undiminished energy. A filter 22 is placed between surface 11 and radiation detecting device 15. The filter 22 will be chosen to have a threshold such as to block radiation below a predetermined energy level. This threshold level will substantially prevent radiation which has traveled through the condensate from reaching the detector 15, while energy which has not passed through the condensate will be passed. Thus, the detector 15 will receive an amount of radiation dependent upon the area of surface 11, which is covered with condensate. The more condensate that forms on surface 11, the less radiation will reach detector 15, and vice versa.

Detector 15 is shown having a biasing input connection 30 connected to a source of biasing voltage at terminal 31. Detector 15 has an output connection 35 upon which a pulsing signal will exist dependent upon the radiation received. The amplitude of the pulses, from detector 15 on connection 35, will be substantially independent of the number of particles reaching detector 15 from surface 11, but will be dependent upon the biasing voltage. The number of pulses per unit time on connection 35 will be indicative of the amount of radiation received by detector 15. Connection 35 is connected to a rate circuit 40, which operates to convert the pulsing signal to a D.C. signal, for example, of magnitude dependent upon the pulse rate, and thus indicative of the amount of radiation received by detector 15. The D.C. output signal from the rate circuit is connected by a conductor 42 to a comparing circuit 45. Comparing circuit 45 has a second input connection 47, which is connected to a movable wiper 48 of a potentiometer resistance element 49. The resistance element 49 is connected by a conductor 51 to the source of biasing voltage at terminal 31, and by conductor 52 to ground or reference potential. Wiper 48 may be adjusted along resistance element 49 to produce a voltage on conductor 47, which acts as a reference voltage for the comparing circuit 45. Comparing circuit 45 may be any suitable circuitry such as a bridge network, which operates to compare the voltage on conductor 42 with that on conductor 47, and to produce an output on a conductor 60 of magnitude and sense depending upon the difference in voltages on conductors 42 and 47. Conductor 60 connects the comparing circuit 45 with a control circuit 63. Control circuit 63 may be connected to a source of power by a conductor 64, and may comprise a relay or linear amplifier. The function of control circuit 63 is to produce an output signal on a conductor 70 of magnitude and sense dependent upon the signal on conductor 60. Conductor 70 is connected to the cooler 17, which in turn is connected to ground or reference potential by a conductor 75. The signal on conductor 70 operates to cause the cooler 17 to either increase or decrease the temperature at the left end of element 10, depending upon the size and sense of the signal on conductor 70.

A temperature measuring device, such as a thermistor 80, is connected at some predetermined location to element 10, and operates to sense the temperature at such location. The temperature measuring device 80 is shown connected to an indicator 85 by conductor 87. Indicator 85 operates to provide an output indicative of the humidity of the ambient air.

In operation, element 10 will be mounted so as to be exposed to the air, the humidity of which is to be measured. Radiation will be emitted from the surface 11, some of which will reach the radiation detector 15, depending upon how much of the surface 11 is covered with condensate. An output signal from the detector 15 will be presented to the rate circuit 40, where it is converted to a D.C. signal of magnitude indicative of the radiation received. This signal is presented to comparing circuit 45 and an ouput will exist on conductor 60 if there is a difference between the signal on conductor 42 and the signal on conductor 47. This signal operates through the control circuit 63 to vary the temperature produced by the cooling device 17. Wiper 48 will be positioned along resistance element 49 so as to change the signal on conductor 47 in such a manner that the cooling device 17 will establish a temperature for element 10 in which the condensate 20 forms over a predetermined area of surface 11. For the simplest operation, the condensate 20 is caused to form on the surface 11 so that the edge between condensate 20 and clear surface lies adjacent temperature measuring device 80. The temperature measuring device 80 will then be measuring the temperature of element 10 along the line where condensate is just beginning to form which, as explained above, is substantially the condensate temperature directly related to humidity.

After wiper 48 has been positioned so that the condensate on surface 11 ends at the correct position, the apparatus will thereafter provide an indication of humidity. If the humidity increases to cause a greater area of condensate to form, the radiation received by detector 15 will be diminished, and thus, the magnitude of the signal on conductor 42 will decrease. A difference will exist between the signals on conductors 42 and 47, so that an output on conductor 60 operating through the control circuit 63, will cause the cooling device 17 to increase the temperature of element 10. This will cause the condensate formation to return toward its initial position. The temperature sensed by device 80 will be higher since the temperature gradient through the element 10 has changed to a higher level, and the indicator 85 will indicate an increased humidity. Likewise, should the humidity decrease, a condensate formation 20 will diminish in area so that radiation detector 15 will receive more radiation and the signal on conductor 42 will increase. An output on conductor 60 will again appear, but this time of opposite sense, since the signal on conductor 42 is now the greater. The signal operating through the control circuit 63 will cause the cooling device 17 to lower the temperature at the left end of element 10, and thus increase the condensate formation 20 until it returns to the original position. The temperature sensed by device 80 will now be lower, since the temperature gradient throughout element 10 is at a lower level, and detector 85 will indicate a decrease in humidity.

A mentioned above, a change in bias supply voltage will cause a change in amplitude of the pulsing signals on conductor 35 from radiation detector 15, and this will result in a change of magnitude of the D.C. signal from the rate circuit 40 on conductor 42. But, since the resistance element 49 is connected between ground or reference potential and the same source of bias voltage, a proportional change in voltage will occur on wiper 48 and conductor 47. The relative voltages on conductors 42 and 47 will therefore not change, even though the bias supply for the radiation detector may drift.

In describing the preferred embodiment above, specific arrangements have been shown which are not intended to be limiting. For example, the cooling device 17 is shown connected at one end of element 10. It will be obvious to one skilled in the art, that the configuration of this cooling device could be altered, and in fact, to establish a desired temperature gradient in element 10, a calibrated or characterized cooling device could be placed in contact throughout the entire lower surface of element 10. Such an arrangement would cool one portion of the element 10 to a greater extent than another portion, and thus, more accurately control the temperature gradient. Likewise, in some cases, a heater could be employed as well as a cooling device located remotely therefrom, so as to more accurately establish a desired temperature gradient. In some cases it might be desirable to place the cooling device in the center of element 10 and have one or more radiation detectors operable to receive radiation from radially remote portions of surface 11. Also, the temperature measuring device 80 could be positioned at points other than adjacent the line between condensate and clear surface, since the temperature gradient will always provide a signal which is related to the condensate temperature. Futhermore, the output of the rate circuit was described as D.C. by way of example. Other suitable signals indicative of pulse rate could also be used. For example, a signal of frequency dependent upon the pulse rate or the pulse rate signal itself, could be readily utilized. These and other changes and alterations will appear obvious to those skilled in the art, and I do not intend to be limited by the specific disclosure used in describing the preferred embodiment.

I claim as my invention:

1. Humidity responsive apparatus comprising, in combination:
   an element having a radioactivity emitting surface exposed to an environment the humidity of which is to be determined;
   temperature controlling means connected to said element to establish a temperature gradient on the surface such that condensate forms on a limited area of the surface to change the radioactivity emitted therefrom;
   radioactivity detecting means mounted to receive radiation emitted from the surface and to produce an output indicative of the area of condensate thereon;
   means connecting said radioactivity detecting means to said temperature controlling means, the output from said radioactivity detecting means regulating said temperature controlling means to maintain a predetermined limited area of condensate on the surface;
   and temperature sensing means connected to said element to produce an output representative of the temperature of the surface at the limit of the area as an indication of the humidity of the environment.

2. Humidity sensing apparatus comprising in combination:
   an element having a surface upon which condensate may form in accordance with the temperature of the surface and the humidity of the ambient atmosphere, said element having a radioactivity emitting portion so that radioactivity is emitted from the surface which radioactivity is diminished by any condensate formation thereon;
   cooling means connected to said element and operable to control the temperature on the surface so that condensate forms in an area of limited extent on the surface;
   radioactivity detecting means mounted to receive radiation from the surface and to produce an output signal in accordance therewith;
   means connecting said radioactivity detecting means to said cooling means so that the cooling means controls the temperature on the surface to maintain the predetermined area of condensate;
   and temperature sensing means connected to the element to produce an output in accordance with the temperature of the surface at the limit of the area of condensate thereon as an indication of the humidity of the ambient atmosphere.

3. Apparatus of the class described comprising, in combination:
   an element having a radioactivity emitting surface;
   cooling means attached to said element in a position to cool a first portion of the surface to a temperature below that necessary to form frost on the first portion of the surface, the temperature of the surface increasing with increasing distance from the first portion so that at some predetermined distance from the first portion of the surface the temperature is substantially equal to the frost point temperature beyond which predetermined distance frost no longer forms, the formation of frost operating to decrease the intensity of radiation emitted by the surface;
   radioactivity sensing means mounted to receive the radiation from the surface and to produce an output in accordance therewith;
   means connecting said radioactivty sensing means to said cooling means to maintain the frost from the first portion of the surface to the predetermined distance;
   and temperature sensing means connected to said element and to produce an output indicative of the temperature of the surface at the predetermined distance.

4. A humidity sensor comprising, in combination:
   an element having a radioactivity emitting surface upon which condensate may form depending upon the surface temperature and the humidity of the ambient air, formation of condensate causing a decrease in the radiation from the surface;
   temperature controlling means connected to said element to control the temperature of the surface so that a temperature gradient exists between a first portion which is below the condensate point temperature and a second portion which is above the condensate point temperature, condensate thereby forming to form an edge intermediate the first and second portions, the temperature of the surface at the edge being related to the frost point temperature;
   radioactivity sensitive means mounted to receive radiation from the surface and to produce an output in accordance therewith;
   means connecting said radioactivity sensitive means to said temperatuure controlling means, the output of said radioactivity sensitive means causing said temperature controlling means to maintain the edge at a predetermined position between the first and second portions on the surface of said element;
   and temperature sensing means connected to said element to provide an output signal indicative of the temperature of the surface at the predetermined position as an indication of the frost point temperature of the ambient air.

5. Apparatus for detecting the humidity of an atmosphere comprising in combination:
   an element having a surface exposed to the atmosphere and having a radioactivity emitting portion;
   cooling means connected to a first portion of the element and operable to establish a temperature gradient on the surface of said element, the temperature gradient normally causing condensate to form on part of the surface only to diminish the radioactivity emitted by the element;
   radioactivity sensing means mounted to receive radiation from the element and to produce an output signal in accordance therewith;
   means connecting said radioactivity sensing means to said cooling means, the output signal varying said cooling means so as to maintain the condensate formation on the surface at a predetermined area;
   and temperature sensing means connected to said element to determine the temperature at the edge of the condensate formation and to produce an output in accordaance therewith as an indication of the humidity of the atmosphere.

6. Apparatus for detecting the humidity of the ambient air comprising, in combination:
   an element having a radioactivity emitting surface exposed to the ambient air;
   temperature controlling means connected to said element to establish a temperature gradient between first and second portions of the surface, the temperature of the first portion being below the frost point temperature and the temperature of the second portion being above the frost point temperature so that frost forms from the first portion toward the second portion to an intermediate portion where the edge of the frost is maintained, the temperature of the intermediate portion being the frost point temperature;
   radioactivity sensing means mounted to receive radiation from the surface of said element, said radiation sensing means receiving different intensities of radiation depending upon the frost formed on the surface, said radiation sensing means producing an output signal indicative of the presence of frost on the surface at the intermediate portion;

means connecting said radioactivity sensing means to said temperature controlling means to adjust the temperature difference between the first and second portions to maintain the frost edge at the intermediate portion;

and temperature sensing means connected to said element to sense the temperature of the intermediate portion of the surface and to produce an output indicative of the humidity of the ambient air.

7. Humidity sensing apparatus comprising:

an element having a radiation emitting surface exposed to the environment the humidity of which is to be sensed;

temperature controlling means connected to said element to establish a temperature gradient on the surface so that a first portion of the surface is at a temperature below the condensate temperature and a second portion of the surface is above the condensate temperature, condensate thereby forming on the first portion to reduce the energy of the radiation from the first portion of the surface;

radiation detecting means mounted to receive radiation from the surface and to produce an output signal indicative of the number of radiation particles received;

a filter mounted between the surface of said element and said radiation detector to attenuate particles from the surface which have reduced energy due to passing through the condensate and to pass particles having energy unreduced by condensate, the output signal from said radiation detector being indicative of the area of condensate on the surface;

reference means operable to produce a controlled output signal;

comparing means connected to said radiation detecting means and to said reference means to compare the output signals therefrom and to produce a resultant signal indicative of difference between the outputs, the resultant signal changing with changes of area of condensate on the surface of said element;

means connecting said comparing means to said temperature controlling means, the resultant signal regulating said temperature controlling means so as to maintain the condensate in a predetermined limited area on the surface of said element;

and temperature sensitive means connected to said element to produce an output signal representative of the temperature of the surface proximate the limit of the area of condensate as an indication of the humidity of the environment.

8. Humidity sensing apparatus comprising:

an element having a radiation emitting surface exposed to the environment the humidity of which is to be sensed;

temperature controlling means connected to said element to establish a temperature gradient on the surface so that a first portion of the surface is at a temperature below the condensate temperature and a second portion of the surface is above the condensate temperature, condensate thereby forming on the first portion to reduce the energy of the radiation from the first portion of the surface;

a source of bias voltage;

radiation detecting means mounted to receive radiation from the surface, having an input connected to the source of bias voltage and to produce an output signal indicative of the number of radiation particles received;

a filter mounted between the surface of said element and said radiation detector to attenuate particles from the surface which have reduced energy due to passing through the codensate and to pass particles having energy unreduced by condensate, the output signal from said radiation detector being indicative of the area of condensate on the surface;

reference means connected to the source of bias voltage and operable to produce a controlled output signal;

comparing means connected to said radiation detecting means and to said reference means to compare the output signals therefrom and to produce a resultant signal indicative of difference between the outputs, the resultant signal changing with changes of area of condensate on the surface of said element;

means connecting said comparing means to said temperature controlling means, the resultant signal regulating said temperature controlling means so as to maintain the condensate in a predetermined limited area on the surface of said element;

temperature sensitive means connected to said element to produce an output signal representative of the surface proximate the limit of the area of condensate;

and indicator means connected to said temperature sensitive means to receive the output signal therefrom and to indicate the humidity of the environment.

References Cited by the Examiner

UNITED STATES PATENTS

| | | | |
|---|---|---|---|
| 2,316,624 | 4/1943 | Romanelli | 73—29 |
| 2,588,355 | 3/1952 | Burr et al. | 73—17 |
| 2,649,707 | 8/1953 | Donath et al. | 73—17 |
| 2,893,237 | 7/1959 | De Coriolis et al. | 73—17 |
| 2,971,461 | 2/1961 | Bradford et al. | 250—83.4 X |
| 2,979,950 | 4/1961 | Leone | 73—17 |
| 2,986,642 | 5/1961 | Schultz | 250—106 |

FOREIGN PATENTS 317,306 8/1929 Great Britain.

LEONARD FORMAN, *Primary Examiner.*

ISAAC LISANN, *Examiner.*

W. D. MARTIN, *Assistant Examiner.*